June 26, 1956  J. M. TOWLER ET AL  2,751,923
LIQUID PRESSURE ACTUATED AUTOMATIC BY-PASS VALVES
Filed July 11, 1952  3 Sheets-Sheet 1
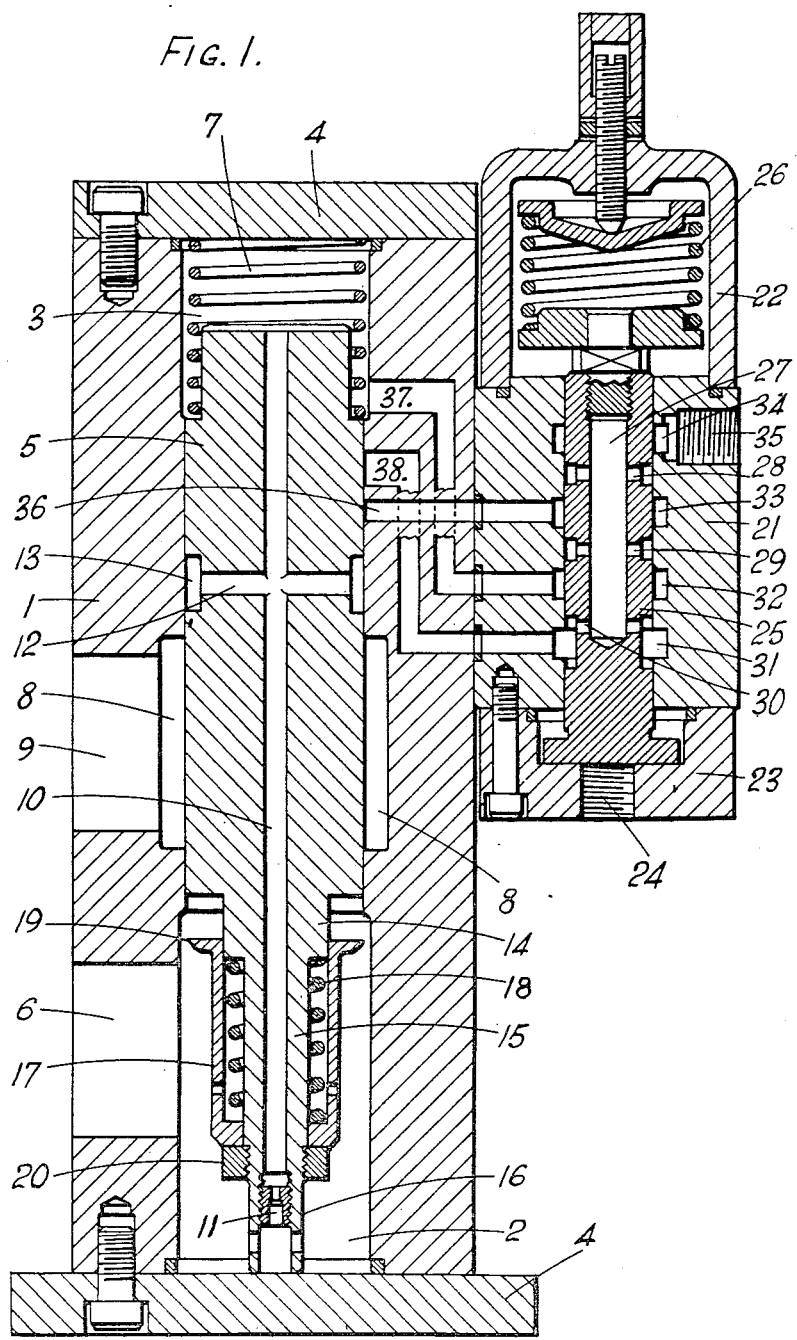
INVENTORS
JOHN MAURICE TOWLER
FRANK HATHORN TOWLER
BY:
Carlson, Pitzner, Hubbard & Wolfe
ATTORNEYS

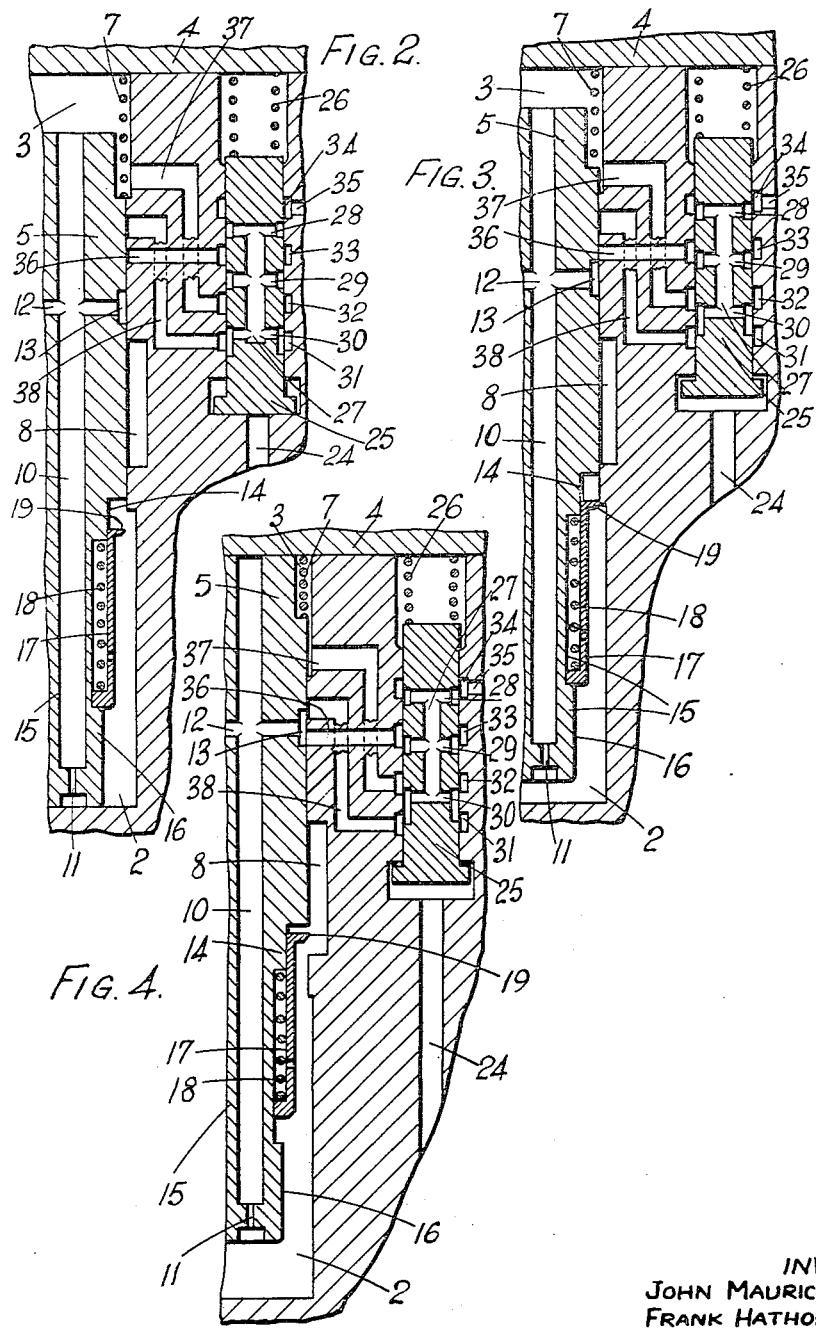

June 26, 1956  J. M. TOWLER ET AL  2,751,923
LIQUID PRESSURE ACTUATED AUTOMATIC BY-PASS VALVES
Filed July 11, 1952  3 Sheets-Sheet 3
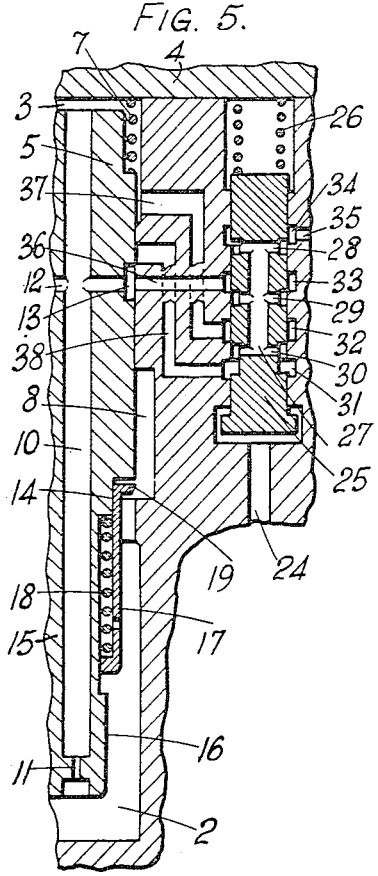
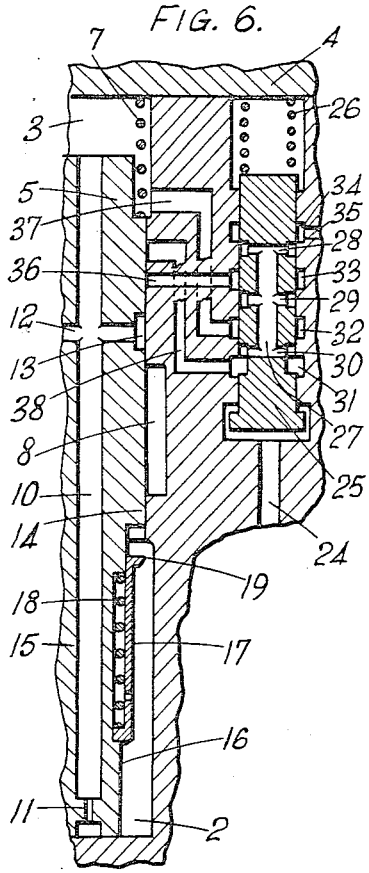
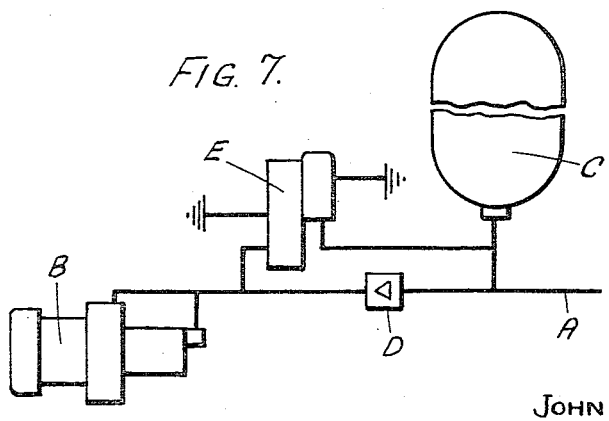
INVENTORS
JOHN MAURICE TOWLER
FRANK HATHORN TOWLER
BY:
Carlson, Pitzner, Hubbard & Wolfe
ATTORNEYS United States Patent Office 2,751,923
Patented June 26, 1956

2,751,923

LIQUID PRESSURE ACTUATED AUTOMATIC BY-PASS VALVES

John Maurice Towler, Rodley, and Frank Hathorn Towler, Dob Park, near Otley, England, assignors to Electraulic Presses Limited, Rodley, near Leeds, England, a British company Application July 11, 1952, Serial No. 298,356

Claims priority, application Great Britain July 11, 1951

8 Claims. (Cl. 137—108)

This invention relates to means for maintaining substantially constant the pressure in an hydraulic system and/or accumulator and particularly to liquid pressure actuated automatic piston type by-pass valves of the kind which control the flow of the pressure liquid by which they are actuated comprising a valve member operable as a piston which on one side is spring loaded to maintain the valve member in the closed position and on the opposite or pressure side is in permanent communication with the inlet for the said pressure liquid, a restricted passage being provided for the flow of pressure liquid from the pressure side of the piston to the opposite side to cause the piston in the valve closed position to be in hydraulic balance, the automatic operation of the piston to open the valve being brought about by permitting pressure liquid to escape from the side of the piston opposite to the pressure side at a rate to cause a difference of pressure to be created across the piston sufficient for it to be moved by pressure on the pressure side against the opposing spring load.

By-pass valves of the type specified above may operate quite satisfactorily at comparatively high pressures when the source of pressure liquid is such as to provide a comparatively large pressure difference to actuate the valve. On the other hand, if the source of pressure liquid is of comparatively low pressure such that there is very little pressure difference available to actuate the valve and/or if the rate of pressure rise and fall is comparatively slow, there is a possibility that, due to the spring load and the friction of the valve spindle, the latter may take up an intermediate position of equilibrium in which the valve is partially open, thereby causing a restriction in the flow liquid through the valve when it should be freely by-passed.

One object of this invention is to provide a by-pass valve or other means, of improved construction such that it is capable of being actuated by a very small pressure difference of the liquid by which it is operated and which will operate satisfactorily when the rate at which the pressure rises and falls is comparatively slow. A further object of this invention is to provide such a means or by-pass valve so constructed that it will open completely when the pressure difference reaches a predetermined figure and it will close completely when the pressure difference falls to a predetermined figure and there shall be no intermediate position of equilibrium in which the valve is partially open.

Yet a further object of this invention is to provide a by-pass valve so constructed that it is capable of operating as an unloading valve for hydraulic pumps which are arranged to charge a low pressure accumulator having a maximum pressure, for example, of about 25 atmospheres, and so arranged that, when the accumulator pressure rises about 3 atmospheres, the by-pass valve will open and unload the pumps and, when the pressure falls the same amount, the valve will close and load the pumps- so that they again charge the accumulator. It is a further object of this invention to provide a by-pass valve so constructed that it will operate satisfactorily with pumps of widely different capacity; the same valve being suitable for unloading a large pump or a small pump.

The present invention is for use in maintaining substantially constant the pressure in an hydraulic system and/or accumulator which is supplied with pressure liquid by one or more continuously running hydraulic pumps past a check valve which prevents the system and/or accumulator discharging when the one or more pumps is or are unloaded and comprises means consisting of a by-pass valve having a valve member the operative area of which is continuously open to the delivery pressure of the one or more pumps and a control or pilot valve having a valve member the operative area of which is continuously open to the pressure within the hydraulic system or accumulator, the arrangement being such that when the pressure within the system or accumulator exceeds a predetermined maximum the valve member of the by-pass valve moves to a position fully to by-pass the delivery of the one or more pumps.

The present invention also comprises means for maintaining substantially constant the pressure in an hydraulic system and/or accumulator which is supplied with pressure liquid from one or more continuously running pumps or other sources of continuous supply, said means comprising in operative combination two valves, one of said valves being adapted to be operated against an opposing spring or other load by pressure of the liquid delivered by said one or more pumps or other source of supply to by-pass the whole of said supply as a result of the creation of a pressure difference across its valve member, and the other valve being adapted to be operated also against a spring or other load by pressure of the liquid in the hydraulic system and/or accumulator, to bring about the creation of the said pressure difference when the pressure in said hydraulic system or accumulator exceeds a predetermined maximum, by permitting pressure liquid to escape from a space at one end of the valve member of the by-pass valve, and to prevent the escape of pressure liquid from said space whereby a condition of hydraulic balance may be restored at the ends of the by-pass valve member to permit the same to be moved by its spring or other load to the closed position when the pressure within the system and/or accumulator falls by a predetermined extent, the arrangement being such that the rate of escape of said pressure liquid from said space is permitted to increase during the opening movement of the by-pass valve member thereby to increase the pressure difference across such by-pass valve member and therefore also the force tending to move said valve member to its fully open position.

In means as above a construction is preferred which permits the rate of escape of pressure liquid from the said space to be controlled by the by-pass valve member in such manner that the rate of escape is permitted to increase when said valve member is moving to the fully open position and is reduced during the return movement of the said valve member to the fully closed position.

It is also preferred that the operative areas of the valve members shall be in permanent communication with the two sources of pressure liquid, in the case of the by-pass valve member with the delivery of the one or more pumps or the like and in the case of the control or pilot valve member with the pressure liquid within the hydraulic system and/or accumulator.

By the term "operative area" is meant that area of each valve member against which the pressure liquid is permitted to act.

According to one embodiment the means of the present invention comprises in operative combination two valves each having a spring loaded piston type valve member one of which valve members is subject to the pressure of the delivery from the one or more pumps or other source of supply and serves to by-pass the whole of said delivery when the pressure in the hydraulic system or accumulator exceeds a predetermined maximum and the other valve member being subject to the pressure of liquid within the hydraulic system or accumulator and adapted to control the operation of the first mentioned or by-pass valve member, wherein there is provided at each end of the by-pass valve member a space, which spaces are connected by a passage having in it a choke of predetermined area, said passage serving to pass pressure liquid from the space which is permanently open to the pressure liquid from the pump or other source of supply to the space at the opposite end of the valve member whereby the valve member will be in hydraulic balance when both spaces are closed to the escape of pressure liquid, an annular groove in the outside periphery of the by-pass valve member intermediate its ends, said groove being connected by one or more lateral ports to the longitudinal passage said annular groove being closed by the wall of the valve bore until the valve member has moved a predetermined distance towards its open position and a main exhaust opening in the wall of the said valve bore through which pressure liquid from the pump or other source is fully by-passed when the by-pass valve member is in the fully open position and wherein the pilot or control valve member serves, on displacement by an excess of pressure within the hydraulic system or accumulator, to open to exhaust at least two ports one of which leads to the space at the end of the by-pass valve member which is remote from the space which is permanently open to the delivery pressure from the one or more pumps or other source of supply and the other port or ports opening into the interior of the by-pass valve bore so as to be closed by the by-pass valve member when the same is in the closed position and to be opened in succession as the by-pass valve member moves to its fully open position whereby pressure liquid is permitted to escape from one of the spaces at one end of the by-pass valve member to bring about the creation of a pressure difference across the choke in said longitudinal passage and automatic movement of the by-pass valve member towards the fully open position in such manner that the rate of such escape increases as the by-pass valve member moves to the fully open position and is correspondingly reduced during the return movement of the said by-pass valve member to the fully closed position.

In order that the invention may be clearly understood and carried into effect such an embodiment will now be described, by way of example, by aid of the accompanying drawings in which:

Fig. 1 is a somewhat diagrammatic view in sectional elevation of the by-pass and pilot valves forming the control means of the present invention according to the abovementioned embodiment.

Figs. 2 to 6 are diagrams showing the relative positions of the two valve members in five different operational positions, and Fig. 7 is a diagram showing the manner in which the means according to the present invention is embodied in an hydraulic system.

In the example illustrated the by-pass valve which in Fig. 7 is indicated generally by the reference E consists of a valve body 1 having a through bore which is enlarged at both ends to form spaces 2 and 3 which are closed and sealed by coverplates 4. In this bore the by-pass-valve member or plunger 5 is a sliding lap fit.

Assuming that the valve is used in the vertical position shown, although in use it may obviously be placed so as to assume any convenient position, the lower space 2 is permanently connected through a port or opening 6 to the delivery main of the one or more pumps B, see Fig. 7, and the upper space 3 will constitute a casing for a light spring 7 which serves to apply a load opposing the upward movement of the valve plunger 5 to the pump unloading position. The port 6 as shown in Fig. 7 is connected to the delivery main A at a point between the pump B and the hydraulic system and/or accumulator C to be supplied, a check valve D being provided between the lead off to the port 6 and the hydraulic system and/or accumulator, to prevent said system and/or accumulator discharging through the by-pass valve E when the pump B is unloaded.

An intermediate portion of the bore of the by-pass valve is enlarged to form an annular outlet chamber 8 see Fig. 1 which communicates with exhaust through an outlet or exhaust port 9 in the valve body, and when the valve plunger 5 is in the lowered position shown in Fig. 1 the inlet port 6 and lower space 2 are isolated from the exhaust port 9 by the full diameter portion of the valve plunger and when said valve plunger is in the fully raised position the interior of the space 2 is permitted to exhaust freely through the exhaust port 9.

The by-pass-valve plunger 5 has a through bore 10 serving permanently to connect the spaces 2 and 3 and at the lower end of said through bore there is formed or fitted a choke or restricted passage 11 which serves to control the rate of flow of pressure liquid from the space 2 to the space 3 so that when the space 3 is partially opened to exhaust the pressure within said space 3 will drop and create a pressure difference across the choke 11 sufficient to cause the by-pass-valve plunger to overcome the pressure of the light spring 7 and so move towards the pump unloading position.

The longitudinal passage or through bore 10 is open by way of radial ports 12 to an annular groove 13 cut in and surrounding the body of the valve plunger 5 at a point in its length where it is normally closed by the surrounding wall of the valve bore.

The lower end of the by-pass-valve plunger which is contained by the space 2 is reduced to form three portions having different diameters, a portion 14 having a diameter less than the full diameter of the valve plunger, a portion 15 having a diameter less than the diameter of the portion 14 and a portion 16 having a diameter less than the diameter of the portion 15.

Slidably mounted on the portions 14 and 15 is a spring pressed sleeve 17 having its spring 18 contained within it and acting to hold the sleeve in the position shown in Fig. 1. This sleeve 17 has a flange 19 at its inner end, the diameter of the peripheral edge of which is slightly less than the full diameter of the valve plunger 5 so that when the sleeve is moved to compress its spring and is within the valve bore there will be a clearance between the two of a few thousandths of an inch. The relative movement of the sleeve 17 is limited in both directions by flanges, on the inward movement by contact with the shoulder formed between the full diameter portion of the valve plunger 5 and the reduced portion 14, and on the outward movement by a collar 20 on the reduced portion 16.

The object of the sleeve 17 is to restrict the flow of pressure liquid from the space 2 to the exhaust outlet 9 in such manner as to ensure that there is always sufficient pressure within space 2 to cause the valve plunger 5 to complete its movement to the fully unloaded position even though the lower end of the full diameter portion of the valve plunger has moved into the enlarged annular groove 8, and even though the pressure within space 2 is low, or the flow through the valve is irregular. When the valve plunger has completed its full movement sleeve 17 will be forced by the pressure within space 2 to move against its spring relatively to the by-pass-valve plunger to a position where the flange 19 has left the valve bore and is within the annular chamber 8, thereby permitting liquid to flow freely from the inlet 6 to the outlet 9. Therefore even if only one small pump is delivering into the accumulator main, there will always be adequate pressure within space 2 to move the by-pass-valve plunger to its fully unloaded position.

Associated with the by-pass-valve is a pilot valve 21 the body of which has a through bore which is closed at one end by a spring casing 22 the interior of which is connected to exhaust and at its opposite end is closed by a cover plate 23 having in it an opening 24 which is permanently connected to the accumulator C. The pilot valve spindle 25 has a sliding lap fit in the pilot valve bore and it is moved by liquid pressure from the accumulator acting on its operative area which is opposite the opening 24 and in opposition to a spring 26.

The pilot valve spindle has a central bore 27 which is closed at both ends and which communicates with three rows of radial ports, 28, 29 and 30, disposed along the spindle. The pilot valve bore is formed interiorly with four annular chambers 31, 32, 33, and 34, said chamber 34 being permanently connected to exhaust by way of an outlet 35. The chamber 33 is connected to the interior of the by-pass-valve bore by passage 36, the chamber 32 is connected to the space 3 of the by-pass-valve by the passage 37, and the chamber 31 is also connected to the interior of the by-pass-valve bore by the passage 38 at a point predeterminedly above the point of entry of the passage 36.

The aforesaid ports 28, 29 and 30, the chambers 31, 32, 33 and 34, and the passages 36, 37, and 38 are all so disposed that the pilot valve and the by-pass-valve will function as follows:

Referring to Fig. 2 this shows the positions of the by-pass-plunger 5 and the pilot-valve spindle 25 when the pressure in the accumulator C and therefore at the opening 24 at the base of the pilot-valve is below a predetermined lower limit; consequently both valves are in the extreme down position, the pilot valve spindle being held down by its spring 26. As pressure rises in the accumulator, due to starting up the pump for instance, the pilot-valve spindle will begin to lift, passing through an intermediate position such as is shown in Fig. 6; but liquid is still sealed in the spring casing or space 3 above the by-pass-plunger and, as pressure builds up in the inlet space or chamber 2, it has access to spring casing 3 through the choke 11; consequently the by-pass-plunger is still in axial balance hydraulically and therefore it continues to be held in the extreme down position by the spring 7. The by-pass-valve in this position is closed.

As the accumulator pressure rises to the upper limit, the pilot valve spindle lifts to its upper position, as shown in Figs. 3 and 4, in which it will be seen that passages 36, 37 and 38 are opened to exhaust at the pilot-valve and through chambers 32, 31 and 33 respectively into ports 29 and 30 and up through central bore 27 and out at ports 28 to exhaust outlet 35. But passages 38 and 36 are still closed by the by-pass-plunger 5, so that liquid from chamber 3 only has access to exhaust along passage 37. Assuming the by-pass-plunger has moved to the position shown in Fig. 3, the full diameter of the plunger is not yet out of the bore and the flange 19 is also within the valve bore. The groove 13 of the by-pass plunger begins to uncover passage 36 which is already connected to exhaust and, as the by-pass plunger end comes out of the valve bore, pressure in chamber 2 forces sleeve 17 and flange 19 sharply up against the bottom of the full diameter portion of the plunger. Thus, with increased access to exhaust along central bore 10 and passage 36, the pressure difference across choke 11 increases forces the by-pass-plunger to its extreme up position as shown in Fig. 4 and uncovering further access to exhaust along passage 38. It will be seen that flange 19 of spring sleeve 17 now controls the flow to exhaust from space 2 to annular chamber 8 and ensures that the spressure in space 2 is sufficient to hold the by-pass plunger in the up position even though the flow may be reduced by, for instance, reduced pump capacity. The by-pass valve is now fully open.

When accumulator pressure at port 24 falls towards the lower limit the pilot-valve spindle 25 will be moved downwards by spring 26, as shown in Fig. 2, first closing the exits of passages 37 and 36, but passage 38 is still open to exhaust. Then as the accumulator pressure reaches the lower limit, further downward movement of pilot-spindle 25 will throttle and finally close the exhaust from passage 38 owing to ports 28 moving out of communication with exhaust outlet annulus 35.

This finally terminates all passage to exhaust from above choke 11 and consequently the pressure builds up in the spring casing or space 3 to the same as that in inlet chamber or space 2 thereby putting the by-pass plunger into axial balance whereby it is moved to the extreme down position by spring 7 as shown in Fig. 6. The by-pass valve is now closed and it will remain closed until the pressure in the accumulator rises to the upper limit and moves the pilot-valve spindle to a position corresponding to Fig. 3.

It will be understood that the rate and force of each of the springs 18, 7 and 26 is such in conjunction with the disposition of the various ports in the two valves that, as the accumulator pressure rises towards the upper limit, the pilot-valve spindle first moves upward followed by the upward and complete movement of the by-pass plunger and, when the supply pressure falls to the lower limit, the pilot-valve spindle first moves downward followed by the downward and complete movement of the by-pass plunger. Thus the by-pass valve is either open or closed and it has no intermediate position of equilibrium.

It will be understood that in the above embodiment the valves have been described and illustrated with their axes vertical, but this was purely for the sake of explanation; they would operate equally well if disposed horizontally.

It should be explained that the spring sleeve 17 described in the above embodiment is only required if there is a wide variation in the capacity of the pump or pumps to be by-passed by the same valve. Furthermore, this spring sleeve may be dispensed with and replaced by a spring relief-valve at the by-pass valve outlet to chamber 8, which would serve the same purpose, namely to restrict the by-pass flow through the valve sufficiently to ensure that there is sufficient pressure at the base of the by-pass plunger to move it to the extreme up position, and hold it there, when the chamber above the said plunger is connected to exhaust through the pilot-valve. However, neither spring sleeve nor relief valve would be required if the flow through the valve were substantially constant, as for instance when operating with a pump of constant capacity, as then the passage to exhaust could be predetermined to ensure that sufficient pressure is always available at the base or operative area of the by-pass valve plunger.

In the embodiment illustrated the through passage 10 is shown as extending through the centre of the valve member. Any other suitable arrangement may, however, be used provided the passage serves the purpose of connecting together the chambers 2 and 3, such for example, as forming the passage within the valve body 1 instead of the valve member 5.

What we claim is:

1. A valve mechanism for maintaining a substantially constant pressure in a hydraulic system supplied with fluid under pressure from a continuous source of supply through a check valve operative to prevent fluid flow toward the source of supply, said valve mechanism comprising, in combination, a by-pass valve including a valve member spring biased toward closed position and normally subjected to the same fluid pressure at both ends to maintain it in hydraulic balance, said by-pass valve being adapted for connection to said hydraulic system between the source of supply and the check valve, a pilot valve adapted for connection to the hydraulic system on the side of the check valve remote from the source of supply and normally biased toward closed position, said pilot valve being operative when the fluid pressure in the hydraulic system exceeds a predetermined value to relieve the fluid pressure at one end of said by-pass valve member to permit movement of the valve member thereof toward open position by the pressure acting on its other end, and means for further relieving the fluid pressure at said one end of the by-pass valve member to accelerate its movement as an incident to the opening movement of said by-pass valve member.

2. A valve mechanism for maintaining a substantially constant pressure on a hydraulic system supplied with fluid under pressure from a continuous source of supply through a check valve operative to prevent fluid flow toward the source of supply, said valve mechanism comprising in combination, a by-pass valve including a valve member having both ends normally exposed to the same fluid pressure and spring biased toward closed position, said by-pass valve being adapted for connection to said hydraulic system between the source of supply and the check valve and operative when opened to by-pass the fluid from said source to exhaust, a pilot valve adapted for connection to the hydraulic system on the side of the check valve remote from the source of supply and normally biased toward closed position, said pilot valve being operative when the fluid pressure in the hydraulic system exceeds a predetermined value to vent fluid exerting pressure on one end of the valve member to permit movement of the valve member toward open position, and means for increasing the fluid venting rate in response to opening the movement of said by-pass valve member, said pilot valve being responsive when fluid pressure in a hydraulic system has reduced below the predetermined value to interrupt the venting of fluid to permit movement of the valve member of said by-pass valve toward closed position, and said means serving to decrease the venting rate during closing movement of said by-pass valve.

3. A valve mechanism for maintaining a substantially constant pressure in a hydraulic system supplied with fluid under pressure by a continuously running pump through a check valve operative to prevent fluid flow toward the pump, said valve mechanism comprising, in combination, a by-pass valve of the balanced fluid pressure type normally biased to a closed position and adapted to be connected to the hydraulic system between the pump and the check valve so that the pressure of the fluid delivered by the pump tends to open the valve, said by-pass valve being operative when open to by-pass the fluid delivered by the pump, a pilot valve normally biased to a closed position and adapted to be connected to the hydraulic system at the side of the check valve remote from the pump so that the pressure of the fluid in the system tends to open the pilot valve, said pilot valve being connected to said by-pass valve so as to create a pressure unbalance in said by-pass valve to initiate its movement toward open position, and means operative as an incident to opening movement of said by-pass valve to increase the pressure in said by-pass valve and thereby accelerate its movement toward open position.

4. A valve mechanism for maintaining a substantially constant pressure in a hydraulic system supplied with fluid under pressure from a continuous source of supply through a check valve operative to prevent fluid flow toward the source of supply, said valve mechanism comprising, in combination, a by-pass valve including a body defining a first chamber connected for direct communication with the source of supply, a second chamber having restricted communication with the source of supply, and a third chamber adapted to be connected to said first chamber for by-passing fluid delivered to said first chamber from the source of supply, said by-pass valve also including a movable valve member extending into each of said chambers and means normally biasing said valve member into closed position to interrupt communication between said first and third chambers, a pilot valve including a body defining a chamber adapted for connection with the hydraulic system at the side of the check valve remote from the source of supply, and having a valve member extending into said pilot valve chamber, said member being normally biased into closed position and movable into an open position when the fluid pressure in the hydraulic system exceeds a predetermined value to permit escape of fluid pressure from the second chamber of said by-pass valve to permit fluid pressure in said first chamber to move said by-pass valve member against the action of said biasing means towards open position to establish communication between said first and third chambers, and said body having a plurality of fluid escape passages controlled by said pilot valve and opened successively in the movement of said by-pass valve member toward open position to accelerate the movement of the member.

5. Valve mechanism for maintaining substantially constant pressure in a hydraulic system supplied with fluid under pressure from a continuous source of supply by way of a check valve preventing flow of fluid toward the source, said valve mechanism comprising, in combination, a housing defining a chamber with an exhaust port opening intermediate its ends, an inlet port opening adjacent one end and a pair of vent ports spaced apart longitudinally of the chamber and opening into its other end, said inlet port being connected to the system between the fluid source and the check valve, a plunger reciprocable in said chamber constructed and arranged to close said exhaust port and one of said vent ports when positioned at one end of the chamber and operative to establish communication between the inlet and outlet ports to by-pass fluid from said source to exhaust when shifted to the other end of said chamber, spring means urging said plunger toward said one end of the chamber, means defining a restricted passage connecting opposite ends of said chamber effective to admit fluid from the inlet port to said other end of the chamber to maintain said plunger in hydraulic balance, valve means including a member normally closing passages communicating with said vent ports and movable in response to a predetermined pressure rise in the system to a position to open the ports to exhaust, the vent port unclosed by said plunger being dimensioned to pass fluid from the chamber at a rate greater than the flow through said restricted passage thereby permitting movement of the plunger toward said other end of the chamber, said plunger being operative to open said one vent port upon predetermined movement to increase the rate of fluid flow from said other end of the chamber and thus permit movement of the plunger at a more rapid rate.

6. In a by-pass valve, in combination, a housing defining a valve chamber, a pressure fluid inlet port opening at one end of the cylinder, a series of vent ports opening at the other end of the chamber, an exhaust port opening intermediate the ends of the chamber, a plunger reciprocable in said cylinder between a closed position in which communication between said inlet port and said exhaust port is interrupted and an open position in which communication between the inlet and exhaust ports is established, spring means biasing said plunger toward closed position, said plunger having a restricted passage connecting the ends of the chamber and admitting fluid from the inlet end to the other end to maintain the plunger hydraulically balanced, a pilot valve normally closing said vent port and operable to open the same to exhaust thereby unbalancing said plunger to permit its movement toward open position, said plunger being operative in closed positions to block certain of said vent ports and operative in its movement toward open positions to open such ports successively to increase the venting rate and thereby accelerate the movement of the plunger.

7. In a by-pass valve, in combination, a housing defining a chamber with an inlet port and an outlet port opening therefrom, an elongated plunger reciprocable in said chamber between a closed position in which communication between said ports is blocked and an open position establishing communication between said ports, a sleeve member mounted on said plunger for movement with and relative to the plunger, and spring means acting between the plunger and said sleeve member urging the latter toward a position to restrict communication between said inlet and exhaust ports when the plunger is in open position so as to maintain a predetermined minimum pressure at the inlet end of said chamber.

8. A by-pass valve as defined in claim 7 in which the plunger is moved to open position by the pressure exerted on it by the fluid in the inlet end of the chamber, and in which said sleeve maintains sufficient pressure in such end of the chamber to maintain the plunger in open position.

References Cited in the file of this patent

UNITED STATES PATENTS

| | | |
|---|---|---|
| 2,312,877 | Campbell | Mar. 2, 1943 |
| 2,437,480 | Pugh et al. | Mar. 9, 1948 |
| 2,513,681 | Schultz | July 4, 1950 |
| 2,571,154 | Mercier | Oct. 16, 1951 |
| 2,642,887 | Renick | June 23, 1953 |